(12) United States Patent
Amari et al.

(10) Patent No.: US 10,393,285 B2
(45) Date of Patent: Aug. 27, 2019

(54) MULTI-ACTUATION CONTROL SYSTEM WITH PRESSURE BALANCING PLUMBING

(71) Applicant: United Technologies Corporation, Farmington, CT (US)

(72) Inventors: Martin Richard Amari, Glastonbury, CT (US); James K. Berry, Bolton, CT (US); Geoffrey T Blackwell, Vernon, CT (US); Xiao D. He, West Hartford, CT (US)

(73) Assignee: United Technologies Corporation, Farmington, CT (US)

( * ) Notice: Subject to any disclaimer, the term of this patent is extended or adjusted under 35 U.S.C. 154(b) by 141 days.

(21) Appl. No.: 15/722,353

(22) Filed: Oct. 2, 2017

(65) Prior Publication Data

US 2019/0101225 A1 Apr. 4, 2019

(51) Int. Cl.
| | |
|---|---|
| F16K 31/124 | (2006.01) |
| F16K 31/42 | (2006.01) |
| F15B 11/22 | (2006.01) |
| F01L 1/344 | (2006.01) |
| F16K 31/40 | (2006.01) |
| F01D 17/14 | (2006.01) |
| F02K 1/15 | (2006.01) |
| F01B 25/12 | (2006.01) |
| F02K 1/76 | (2006.01) |

(52) U.S. Cl.
CPC .......... *F16K 31/1245* (2013.01); *F01B 25/12* (2013.01); *F01D 17/14* (2013.01); *F01L 1/3442* (2013.01); *F02K 1/15* (2013.01); *F02K 1/763* (2013.01); *F15B 11/22* (2013.01); *F16K 31/408* (2013.01); *F16K 31/42* (2013.01); *F16K 31/423* (2013.01); *F05D 2220/32* (2013.01); *F05D 2270/64* (2013.01); *F15B 2211/50572* (2013.01)

(58) Field of Classification Search
CPC .......... F01D 17/143; F02K 1/08; F02K 1/085; F15B 11/22; F16K 31/124; F16K 31/1245
See application file for complete search history.

(56) References Cited

U.S. PATENT DOCUMENTS

| | | | | |
|---|---|---|---|---|
| 2,866,315 A | * | 12/1958 | Schakel | F02K 1/15 |
| | | | | 192/143 |
| 3,060,680 A | * | 10/1962 | Light | F02K 3/075 |
| | | | | 239/265.25 |

(Continued)

FOREIGN PATENT DOCUMENTS

| | | |
|---|---|---|
| JP | 3092793 B2 | 9/2000 |
| WO | WO2017103464 A1 | 6/2017 |

OTHER PUBLICATIONS

Extended European Search Report for EP Application No. 18186888.6, dated Jan. 21, 2019, pp. 8.

*Primary Examiner* — Michael Leslie
*Assistant Examiner* — Matthew Wiblin
(74) *Attorney, Agent, or Firm* — Kinney & Lange, P.A.

(57) ABSTRACT

A multi-actuation system includes a first electrohydraulic servo valve and a first actuator. A first fluid line fluidically connects the first electrohydraulic servo valve to the first actuator. The multi-actuation system also includes a second electrohydraulic servo valve and a second actuator. A second fluid line fluidically connects the second electrohydraulic servo valve to the second actuator. A ring fluidically connects the first fluid line with the second fluid line.

20 Claims, 2 Drawing Sheets

(56) References Cited

U.S. PATENT DOCUMENTS

| | | | | |
|---|---|---|---|---|
| 3,515,033 | A * | 6/1970 | Geyer | B62D 5/24 92/33 |
| 4,391,409 | A | 7/1983 | Scholz | |
| 5,029,514 | A * | 7/1991 | Pickard | F15B 21/042 239/265.33 |
| 5,129,310 | A | 7/1992 | Ma | |
| 5,685,141 | A * | 11/1997 | Markstein | F02K 1/15 239/265.19 |
| 5,694,767 | A * | 12/1997 | Vdoviak | F02K 3/10 60/226.3 |
| 6,622,474 | B1 * | 9/2003 | Sternberger | F02K 1/72 60/226.2 |
| 6,968,675 | B2 * | 11/2005 | Ramlaoui | F02K 1/72 60/226.1 |
| 7,370,468 | B2 * | 5/2008 | Colotte | F02K 1/763 244/110 B |
| 8,033,509 | B2 | 10/2011 | Yount et al. | |
| 8,256,225 | B2 * | 9/2012 | Baltas | F02K 1/42 239/265.19 |
| 8,474,752 | B2 | 7/2013 | Kirkland | |
| 2012/0137654 | A1 * | 6/2012 | Burgess | F02K 1/06 60/204 |
| 2013/0061572 | A1 | 3/2013 | Le Coq | |

\* cited by examiner

MULTI-ACTUATION CONTROL SYSTEM WITH PRESSURE BALANCING PLUMBING

STATEMENT OF GOVERNMENT INTEREST

This invention was made with government support under Contract No. FA8626-16-C-2139 awarded by the United States Air Force. The government has certain rights in the invention.

BACKGROUND

The present disclosure relates to effectors for gas turbine engines, and more specifically to actuation systems for effectors in gas turbine engines.

Engine effectors, such as variable area exit nozzles and thrust reversers, on gas turbine engines utilize multi-actuation systems that move and translate the parts of the engine effectors in a synchronized manner. Typically, a multi-actuation system on a gas turbine engine is configured with one electrohydraulic servo valve (EHSV) that provides hydraulic flow to all of the actuators of the multi-actuation system. A multi-actuation system with a single EHSV requires tight kinematics to maintain accuracy of the actuators since there is no mechanism between the actuators to keep the actuators synchronized to each other. If one of the actuators experiences more force resistance than the other actuators, that actuator may fall out of synchronization with the other actuators and introduce error into the multi-actuation system. Error between actuators in the multi-actuation system can cause the connected engine effector to skew and reduce overall engine efficiency.

SUMMARY

In one embodiment, a multi-actuation system includes a first electrohydraulic servo valve and a first actuator. A first fluid line fluidically connects the first electrohydraulic servo valve to the first actuator. The multi-actuation system also includes a second electrohydraulic servo valve and a second actuator. A second fluid line fluidically connects the second electrohydraulic servo valve to the second actuator. A ring fluidically connects the first fluid line with the second fluid line.

In another embodiment, a gas turbine engine includes a plurality of actuation assemblies circumferentially spaced from one another about a centerline of the gas turbine engine. Each of the actuation assemblies includes an electrohydraulic servo valve, an actuator, and a fluid line fluidically connecting the electrohydraulic servo valve to the actuator. The gas turbine engine also includes a ring that fluidically connects the fluid lines of the actuation assemblies together.

In another embodiment, a multi-actuation system includes a first electrohydraulic servo valve and a first actuator. The first actuator includes an extend side and a retract side. A first extend line fluidically connects the first electrohydraulic servo valve to the extend side of the first actuator. A first retract line fluidically connects the first electrohydraulic servo valve to the retract side of the first actuator. The multi-actuation system further includes a second electrohydraulic servo valve and a second actuator. The second actuator includes an extend side and a retract side. A second extend line fluidically connects the second electrohydraulic servo valve to the extend side of the second actuator. A second retract line fluidically connecting the second electrohydraulic servo valve to the retract side of the second actuator. A first ring fluidically connects the first extend line with the second extend line.

Persons of ordinary skill in the art will recognize that other aspects and embodiments are possible in view of the entirety of the present disclosure, including the accompanying figures.

Figure 1:
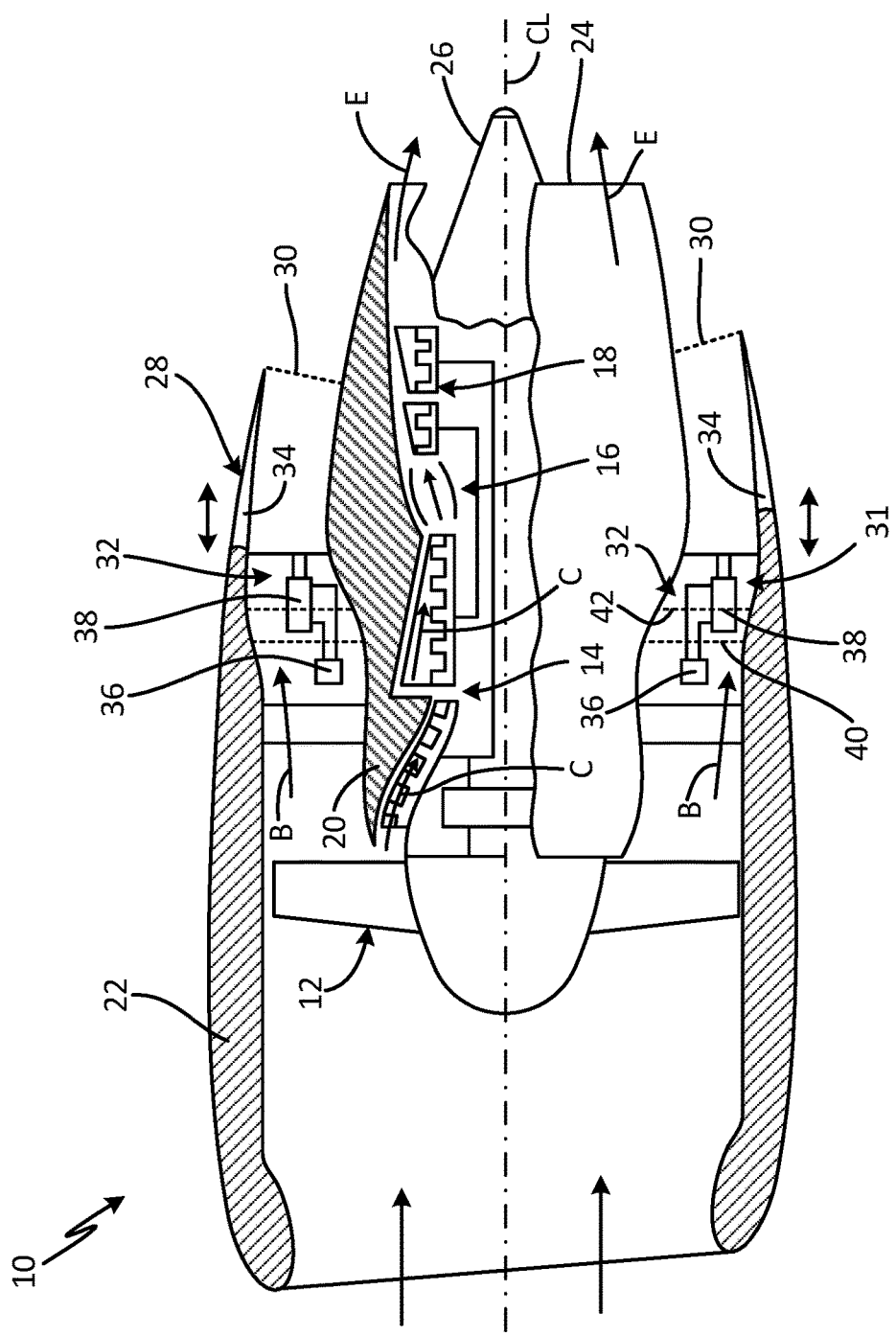
FIG. 1 is a partial cross-sectional view of a gas turbine engine with a multi-actuation system, according to an embodiment.

While the above-identified drawing figures set forth one or more embodiments, other embodiments are also contemplated. It should be understood that numerous other modifications and embodiments can be devised by those skilled in the art, which fall within the scope and spirit of the principles of the claims. The figures may not be drawn to scale, and applications and embodiments may include features and components not specifically shown in the drawings. Like reference numerals identify similar structural elements.

DETAILED DESCRIPTION

The disclosure relates to a multi-actuation system with multiple electrohydraulic servo valves (EHSV) and multiple actuators. Each EHSV is paired with one of the actuators. The EHSV in each pair is connected with its respective actuator by an extend line and by a retract line. A first pressure balancing ring fluidically connects all of the extend lines together. A second pressure balancing ring fluidically connects all of the retract lines together. This configuration allows for very tight control of the multi-actuation system in normal operation and a reduction in opposing actuator forces in the situation where one of the actuators fails. Using the pressure balancing rings allows for a lighter, more compact, and simpler design of the effector as the effector can rely more on the actuators for proper positioning rather than bulkier kinematic assemblies. The multi-actuation system with pressure balancing rings is described below with reference to FIGS. 1-2.

FIG. 1 is a partial cross-sectional view that schematically illustrates example gas turbine engine 10. Gas turbine engine 10 includes fan section 12, compressor section 14, combustor section 16 and turbine section 18. Compressor section 14, combustor section 16, and turbine section 18 extend axially along engine centerline CL and are housed inside core nacelle 20. Fan nacelle 22 at least partially surrounds fan section 12 and core nacelle 20. During operation, fan section 12 pulls airflow into fan nacelle 22 and drives air along bypass flow path B. Compressor section 14 draws a portion of the airflow into core nacelle 20 along core flow path C where the air is compressed and communicated to combustor section 16. In combustor section 16, the air is mixed with fuel and ignited to generate a high-pressure exhaust gas stream that expands through turbine section 18 where energy is extracted and utilized to drive fan section 12 and compressor section 14. A core engine exhaust E exits core nacelle 20 through core nozzle 24 defined between core nacelle 20 and a tail cone 26.

Although the disclosed non-limiting embodiment depicts a turbofan gas turbine engine, it should be understood that the concepts described herein are not limited to use with turbofans as the teachings may be applied to other types of turbine engines; for example, an industrial gas turbine; a reverse-flow gas turbine engine; a turbojet engine; and a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

Fan variable area nozzle (VAFN) 28 is connected to an aft end of fan nacelle 22 and defines fan nozzle exit area 30. The air driven by fan section 12 along bypass flow path B is discharged from engine 10 via VAFN 28 to provide thrust. Thrust is a function of density, velocity, and area. One or more of these parameters can be manipulated by VAFN 28 to vary the amount and direction of thrust provided by the bypass flow B. VAFN 28 operates to effectively vary the area of fan nozzle exit area 30 to selectively adjust the pressure ratio of the bypass flow B. Low pressure ratio turbofans, such as gas turbine engine 10 in FIG. 1, are desirable for their high propulsive efficiency. However, low pressure ratio fans may be inherently susceptible to fan stability/flutter problems at low power and low flight speeds. VAFN 28 allows gas turbine engine 10 to change to a more favorable fan operating line at low power, avoiding the instability region, and still provide the relatively smaller nozzle area necessary to obtain a high-efficiency fan operating line at cruise.

VAFN 28 varies fan nozzle exit area 30 by using a multi-actuation system 31 with a plurality of actuation assemblies 32 to move effectors 34 in the axial and/or radial direction relative engine centerline (CL). As shown in FIG. 1, actuation assemblies 32 are circumferentially spaced from one another about the centerline CL of gas turbine engine 10, and effectors 34 are connected to actuation assemblies 32. Actuation assemblies 32 can be connected to an annular case (not shown) for fan section 12 or to fan nacelle 22. Each actuation assembly 32 (two of which are shown in FIG. 1) includes electrohydraulic servo valve (EHSV) 36 and actuator 38. Each EHSV 36 is fluidically connected to its respective actuator 38 and controls the actuator 38 by varying the amount of hydraulic fluid (not shown) in actuator 38. Actuators 38 are connected to effectors 34 and axially or radially translate effectors 34 under the control of EHSVs 36. During operation of gas turbine engine 10, each actuation assembly 32 moves in unison with the other actuation assemblies 32 to translate effectors 34 of VAFN 28 to a desired position. As discussed below with reference to FIG. 2, first ring 40 and second ring 42 fluidically interconnect actuation assemblies 32 to each other to pressure balance actuation assemblies 32.

Figure 2:
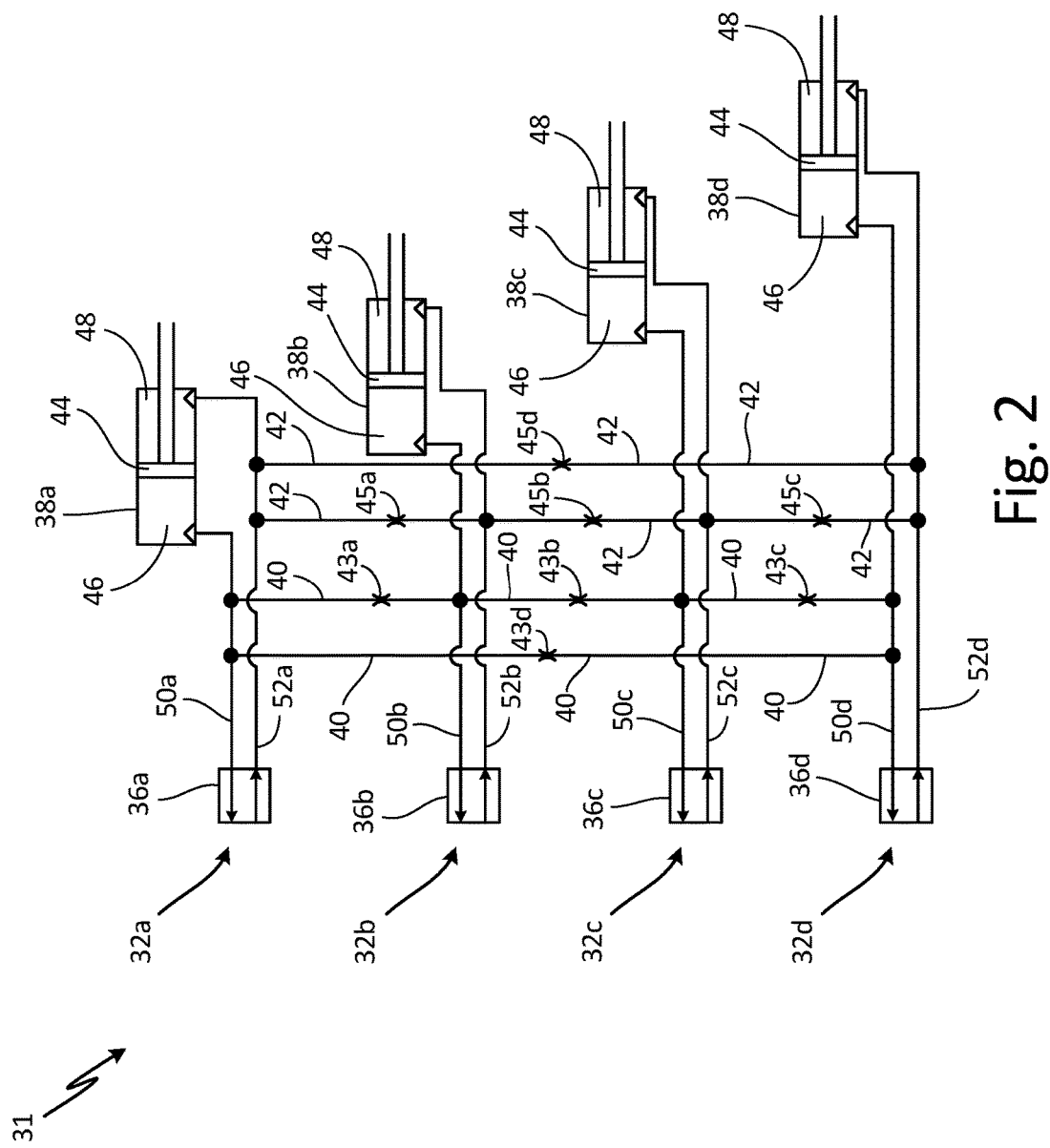
FIG. 2 is a schematic diagram of the multi-actuation system, according to an embodiment.

FIG. 2 is a schematic diagram of multi-actuation system 31 with first ring 40 and second ring 42. As shown in FIG. 2, multi-actuation system 31 includes a first actuation assembly 32a, a second actuation assembly 32b, a third actuation assembly 32c, and a fourth actuation assembly 32d. Each of actuation assemblies 32a-32d includes one of EHSVs 36a-36d respectively and one of actuators 38a-38d respectively. Each of actuators 38a-38d in FIG. 2 is a hydraulic piston 44, with each hydraulic piston 44 having an extend side 46 opposite a retract side 48. Actuation assemblies 32a-32d also include extend lines 50a-50d respectively and retract lines 52a-52d respectively. In each of actuation assemblies 32a-32d, extend line 50 is a fluid line that fluidically connects EHSV 36 to extend side 46 of actuator 38. Retract line 52 is a fluid line that fluidically connects EHSV 36 to retract side 48 of actuator 38.

First ring 40 is a fluid line that circumferentially extends completely around centerline CL (shown in FIG. 1) of gas turbine engine 10 to fluidically connect extend lines 50a-50d with each other. As shown in FIG. 2, first ring 40 is connected to extend line 50a in actuation assembly 32a and extends to and connects with extend line 50b in actuation assembly 32b. First ring 40 continues beyond actuation assembly 32b to connect with extend line 50c in actuation assembly 32c. First ring 40 continues to actuation assembly 32d to connect with extend line 50d in actuation assembly 32d. To complete a full loop, first ring 40 extends from extend line 50d in actuation assembly 32d to connect with extend line 50a in actuation assembly 32a. While first ring 40 intersects and fluidically connects with each of extend lines 50a-50d, first ring 40 does not fluidically connect any of retract lines 52a-52d of actuation assemblies 32a-32d.

As shown in FIG. 2, first ring 40 includes first flow restrictor 43a, second flow restrictor 43b, third flow restrictor 43c, and fourth flow restrictor 43d. First flow restrictor 43a is positioned inside first ring 40 between extend line 50a and extend line 50b. Second flow restrictor 43b is positioned inside first ring 40 between extend line 50b and extend line 50c. Third flow restrictor 43c is positioned inside first ring 40 between extend line 50c and extend line 50d. Fourth flow restrictor 43d is positioned inside first ring 40 between extend line 50d and extend line 50a. Flow restrictors 43a, 43b, 43c, and 43d can all be orifice plates that locally reduce the cross-sectional flow area of first ring 40 such that first ring 40 has a smaller cross-sectional flow area at the locations of flow restrictors 43a, 43b, 43c, and 43d than a minimum cross-sectional flow area of extend lines 50a, 50b, 50c, and 50d.

Second ring 42 is a fluid line that circumferentially extends completely around centerline CL (shown in FIG. 1) of gas turbine engine 10 to fluidically connect all of retract lines 52a-52d with each other. As shown in FIG. 2, second ring 42 is connected to retract line 52a in actuation assembly 32a and extends to and connects with retract line 52b in actuation assembly 32b. Second ring 42 continues beyond actuation assembly 32b to connect with retract line 52c in actuation assembly 32c. Second ring 42 continues to actuation assembly 32d to connect with retract line 52d in actuation assembly 32d. To complete a loop, second ring 42 extends from retract line 52d in actuation assembly 32d to connect with retract line 52a in actuation assembly 32a. While second ring 42 intersects and fluidically connects with each of retract lines 52a-52d, second ring 42 does not fluidically connect any of extend lines 50a-50d of actuation assemblies 32a-32d. First ring 40 and second ring 42 can be disposed within or around a circumference of an annular case of fan section 12 (shown in FIG. 1), or on fan nacelle 22 (also shown in FIG. 1).

As shown in FIG. 2, second ring 42 includes fifth flow restrictor 45a, sixth flow restrictor 45b, seventh flow restrictor 45c, and eighth flow restrictor 45d. Fifth flow restrictor 45a is positioned inside second ring 42 between retract line 52a and retract line 52b. Sixth flow restrictor 45b is positioned inside second ring 42 between retract line 52b and retract line 52c. Seventh flow restrictor 45c is positioned inside second ring 42 between retract line 52c and retract line 52d. Eighth flow restrictor 45d is positioned inside second ring 42 between retract line 52d and retract line 52a. Flow restrictors 45a, 45b, 45c, and 45d can all be orifice plates that locally reduce the cross-sectional flow area of second ring 42 such that second ring 42 has a smaller cross-sectional flow area at the locations of flow restrictors 45a, 45b, 45c, and 45d than a minimum cross-sectional flow area of retract lines 52a, 52b, 52c, and 52d.

During operation of multi-actuation system 31, EHSVs 36a-36d in actuation assemblies 32a-32d can cause actuators 38a-38d respectively to extend aftward by directing hydraulic fluid into the extend sides 46 of the actuators 38a-38d via their respective extend lines 50a-50d. To retract actuators 38a-38d in the forward direction, EHSVs 36a-36d in actuation assemblies 32a-32d direct hydraulic fluid into the retract sides 48 of their respective actuators 38a-38d via their respective retract lines 52a-52d. If one of actuator assemblies 32a-32d moves out of synchronization with the rest of actuator assemblies 32a-32d, the respective EHSV 36 for that actuator assembly 32 can readjust the actuator 38 back into synchronization with the rest of actuators 38a-38d in actuation assemblies 32a-32d. Flow restrictors 43a-43d and flow restrictors 45a-45d slow the movement of hydraulic fluid between actuator assemblies 32a-32d via first ring 40 and first ring 42 such that the respective EHSV 36 can make the adjustment to the unsynchronized actuator assembly 32 relative the other actuator assemblies 32. Should the EHSV 36 and/or the actuator 38 fail in one of actuator assemblies 32a-32d, first ring 40 and second ring 42 will protect multi-actuation system 31 and VAFN 28 from skewing relative centerline CL (shown in FIG. 1) and damaging VAFN 28. For example, should EHSV 36a in actuation assembly 32a malfunction and direct more hydraulic fluid into extend line 50a than the other EHSVs 36b-36d in actuation assemblies 32b-32d, the extra fluid in extend line 50a of actuation assembly 32a will create a pressure differential relative the other extend lines 50b-50d in actuation assemblies 32b-32d. This pressure differential will cause the extra fluid in extend line 50a of actuation assembly 32a to enter first ring 40 and to be shared evenly between all extend lines 50a-50d, causing all of actuators 38a-38d in actuation assemblies 32a-32d to move the same distance, instead of one actuator 38 moving further than the rest.

In another example, should EHSV 36a in actuation assembly 32a malfunction and direct hydraulic fluid into retract line 52a while EHSVs 36b-36d of actuation assemblies 32b-32d direct hydraulic fluid into extend lines 50b-50d, second ring 42 will share hydraulic fluid from retract line 52a of actuation assembly 32a with retract lines 52b-52d of actuation assemblies 32b-32d until all of the retract lines 52a-52b of actuation assemblies 32a-32d are pressure-balanced. First ring 40 will direct hydraulic fluid from extend lines 50b-50d of actuation assemblies 32b-32d into extend line 50a of actuation assembly 32a until all of extend lines 50a-50d of actuation assemblies 32a-32d are pressure balanced.

In view of the foregoing description, it will be recognized that the present disclosure provides numerous advantages and benefits. For example, first ring 40 and second ring 42 function as fail-safe mechanisms in multi-actuation system 31 by preventing one actuator 38 from acting completely independent from the other actuators 38 in multi-actuation system 31 and skewing VAFN 28 relative centerline CL (shown in FIG. 1) and damaging VAFN 28. Flow restrictors 43a-43d and flow restrictors 45a-45d inside first ring 40 and second ring 42 respectively do allow each actuator 38 enough independence from the other actuators 38 so that the actuator 38 is able to make adjustments relative the other actuators 38 to keep the multi-actuation system 31 in synchronization. Furthermore, multi-actuation system 31 does not rely on bulky and heavy kinematic systems to translate and synchronize the actuators in VAFN 28. Rather, multi-actuation system 31 relies on a relative light assembly of EHSVs 36 and hydraulic actuators 38 to translate VAFN 28.

The following are non-exclusive descriptions of possible embodiments of the present invention.

In one embodiment, a multi-actuation system includes a first electrohydraulic servo valve and a first actuator. A first fluid line fluidically connects the first electrohydraulic servo valve to the first actuator. The multi-actuation system also includes a second electrohydraulic servo valve and a second actuator. A second fluid line fluidically connects the second electrohydraulic servo valve to the second actuator. A ring fluidically connects the first fluid line with the second fluid line.

The multi-actuation system of the preceding paragraph can optionally include, additionally and/or alternatively, any one or more of the following features, configurations and/or additional components:

the first actuator and the second actuator are both hydraulic pistons with each hydraulic piston comprising an extend side opposite a retract side;

the first fluid line fluidically connects the first electrohydraulic servo valve to the extend side of the first actuator;

the second fluid line fluidically connects the second electrohydraulic servo valve to the extend side of the second actuator;

a third fluid line fluidically connecting the first electrohydraulic servo valve to the retract side of the first actuator; and a fourth fluid line fluidically connecting the second electrohydraulic servo valve to the retract side of the second actuator; and/or a second ring fluidically connecting the third fluid line with the fourth fluid line; a first flow restrictor disposed inside the first ring; and a second flow restrictor disposed inside the second ring, wherein a cross-sectional flow area of the first ring at the first flow restrictor is smaller than a minimum cross-sectional flow area of the first fluid line and the second fluid line, and wherein a cross-sectional flow area of the second ring at the second flow restrictor is smaller than a minimum cross-sectional flow area of the third fluid line and the fourth fluid line.

In another embodiment, a gas turbine engine includes a plurality of actuation assemblies circumferentially spaced from one another about a centerline of the gas turbine engine. Each of the actuation assemblies includes an electrohydraulic servo valve, an actuator, and a fluid line fluidically connecting the electrohydraulic servo valve to the actuator. The gas turbine engine also includes a ring that fluidically connects the fluid lines of the actuation assemblies together.

The gas turbine engine of the preceding paragraph can optionally include, additionally and/or alternatively, any one or more of the following features, configurations and/or additional components:

each actuator in the plurality of actuation assemblies is a hydraulic piston with an extend side opposite a retract side;

the fluid line in each of the actuation assemblies fluidically connects the electrohydraulic servo valve to the extend side of the actuator;

each of the actuation assemblies further comprises: a second fluid line fluidically connecting the electrohydraulic servo valve to the retract side of the actuator;

a second ring fluidically connecting the second fluid lines of the actuation assemblies together;

the ring circumferentially extends completely around the centerline of the gas turbine engine in a complete loop;

the second ring circumferentially extends completely around the centerline of the gas turbine engine in a complete loop;

an effector connected to the plurality of actuation assemblies and configured to be translated by the plurality of actuation assemblies to modify a gas flow within the gas turbine engine; and/or the effector is selected from the group consisting of variable area nozzles, flow reversers, and flow diverters.

In another embodiment, a multi-actuation system includes a first electrohydraulic servo valve and a first actuator. The first actuator includes an extend side and a retract side. A first extend line fluidically connects the first electrohydraulic servo valve to the extend side of the first actuator. A first retract line fluidically connects the first electrohydraulic servo valve to the retract side of the first actuator. The multi-actuation system further includes a second electrohydraulic servo valve and a second actuator. The second actuator includes an extend side and a retract side. A second extend line fluidically connects the second electrohydraulic servo valve to the extend side of the second actuator. A second retract line fluidically connecting the second electrohydraulic servo valve to the retract side of the second actuator. A first ring fluidically connects the first extend line with the second extend line.

The multi-actuation system of the preceding paragraph can optionally include, additionally and/or alternatively, any one or more of the following features, configurations and/or additional components:

a second ring fluidically connecting the first retract line with the second retract line;

the first actuator and the second actuator are hydraulic pistons;

the first actuator and the second actuator are disposed on an annular case and are circumferentially spaced apart from one another; and/or the first ring and the second ring are disposed on or within the case, and extend the full circumference of the case.

Any relative terms or terms of degree used herein, such as "substantially", "essentially", "generally", "approximately", and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, transitory vibrations and sway movements, temporary alignment or shape variations induced by operational conditions, and the like.

While the invention has been described with reference to an exemplary embodiment(s), it will be understood by those skilled in the art that various changes may be made and equivalents may be substituted for elements thereof without departing from the scope of the invention. For example, while FIG. 1 shows multi-actuation system 31 being used in a VAFN 28 on fan nacelle 22, multi-actuation system 31 can be used in a variable exit nozzle on core nacelle 20. Multi-actuation 31 can also be used to translate effectors in flow reversers and flow diverters. In addition, many modifications may be made to adapt a particular situation or material to the teachings of the invention without departing from the essential scope thereof. For example, while FIG. 2 shows multi-actuation system 31 with four actuation assemblies 32, multi-actuation system 31 can include more than four actuation assemblies 32, or less than four actuation assemblies. Therefore, it is intended that the invention not be limited to the particular embodiment(s) disclosed, but that the invention will include all embodiments falling within the scope of the appended claims.

The invention claimed is:

1. A multi-actuation system comprising:
   a first electrohydraulic servo valve;
   a first actuator;
   a first fluid line fluidically connecting the first electrohydraulic servo valve to the first actuator;
   a second electrohydraulic servo valve;
   a second actuator;
   a second fluid line fluidically connecting the second electrohydraulic servo valve to the second actuator; and
   a ring fluidically connecting the first fluid line with the second fluid line.

2. The multi-actuation system of claim 1, wherein the first actuator and the second actuator both comprise hydraulic pistons with each hydraulic piston comprising an extend side opposite a retract side.

3. The multi-actuation system of claim 2, wherein the first fluid line fluidically connects the first electrohydraulic servo valve to the extend side of the first actuator.

4. The multi-actuation system of claim 3, wherein the second fluid line fluidically connects the second electrohydraulic servo valve to the extend side of the second actuator.

5. The multi-actuation system of claim 4, further comprising:
   a third fluid line fluidically connecting the first electrohydraulic servo valve to the retract side of the first actuator; and
   a fourth fluid line fluidically connecting the second electrohydraulic servo valve to the retract side of the second actuator.

6. The multi-actuation system of claim 5, further comprising:
   a second ring fluidically connecting the third fluid line with the fourth fluid line;
   a first flow restrictor disposed inside the first ring; and
   a second flow restrictor disposed inside the second ring,
   wherein a cross-sectional flow area of the first ring at the first flow restrictor is smaller than a minimum cross-sectional flow area of the first fluid line and the second fluid line, and
   wherein a cross-sectional flow area of the second ring at the second flow restrictor is smaller than a minimum cross-sectional flow area of the third fluid line and the fourth fluid line.

7. A gas turbine engine comprising:
   a plurality of actuation assemblies circumferentially spaced from one another about a centerline of the gas turbine engine, wherein each of the actuation assemblies comprises:
      an electrohydraulic servo valve;
      an actuator; and
      a fluid line fluidically connecting the electrohydraulic servo valve to the actuator; and
   a ring fluidically connecting the fluid lines of the actuation assemblies together.

8. The gas turbine engine of claim 7, wherein each actuator in the plurality of actuation assemblies comprises a hydraulic piston with an extend side opposite a retract side.

9. The gas turbine engine of claim 8, wherein the fluid line in each of the actuation assemblies fluidically connects the electrohydraulic servo valve to the extend side of the actuator.

10. The gas turbine engine of claim 9, wherein each of the actuation assemblies further comprises:
a second fluid line fluidically connecting the electrohydraulic servo valve to the retract side of the actuator.

11. The gas turbine engine of claim 10, further comprising:
a second ring fluidically connecting the second fluid lines of the actuation assemblies together.

12. The gas turbine engine of claim 11, wherein the ring circumferentially extends completely around the centerline of the gas turbine engine in a complete loop.

13. The gas turbine engine of claim 11, wherein the second ring circumferentially extends completely around the centerline of the gas turbine engine in a complete loop.

14. The gas turbine engine of claim 7 further comprising:
an effector connected to the plurality of actuation assemblies and configured to be translated by the plurality of actuation assemblies to modify a gas flow within the gas turbine engine.

15. The gas turbine engine of claim 14, wherein the effector is selected from the group consisting of variable area nozzles, flow reversers, and flow diverters.

16. A multi-actuation system comprising:
a first electrohydraulic servo valve;
a first actuator, wherein the first actuator comprises an extend side and a retract side;
a first extend line fluidically connecting the first electrohydraulic servo valve to the extend side of the first actuator;
a first retract line fluidically connecting the first electrohydraulic servo valve to the retract side of the first actuator;
a second electrohydraulic servo valve;
a second actuator; wherein the second actuator comprises an extend side and a retract side;
a second extend line fluidically connecting the second electrohydraulic servo valve to the extend side of the second actuator;
a second retract line fluidically connecting the second electrohydraulic servo valve to the retract side of the second actuator; and
a first ring fluidically connecting the first extend line with the second extend line.

17. The multi-actuation system of claim 16 further comprising:
a second ring fluidically connecting the first retract line with the second retract line.

18. The multi-actuation system of claim 17, wherein the first actuator and the second actuator comprise a hydraulic piston.

19. The multi-actuation system of claim 17, wherein the first actuator and the second actuator are disposed on an annular case and are circumferentially spaced apart from one another.

20. The multi-actuation system of claim 19, wherein the first ring and the second ring are disposed on or within the case, and extend the full circumference of the case.

* * * * *